Sept. 2, 1947.    A. F. ECKEL    2,426,601
CALCULATOR AND DECIMAL POINT LOCATOR
Filed Oct. 5, 1945    2 Sheets-Sheet 1

INVENTOR.
Arthur F. Eckel.
BY

Sept. 2, 1947.    A. F. ECKEL    2,426,601
CALCULATOR AND DECIMAL POINT LOCATOR
Filed Oct. 5, 1945    2 Sheets-Sheet 2
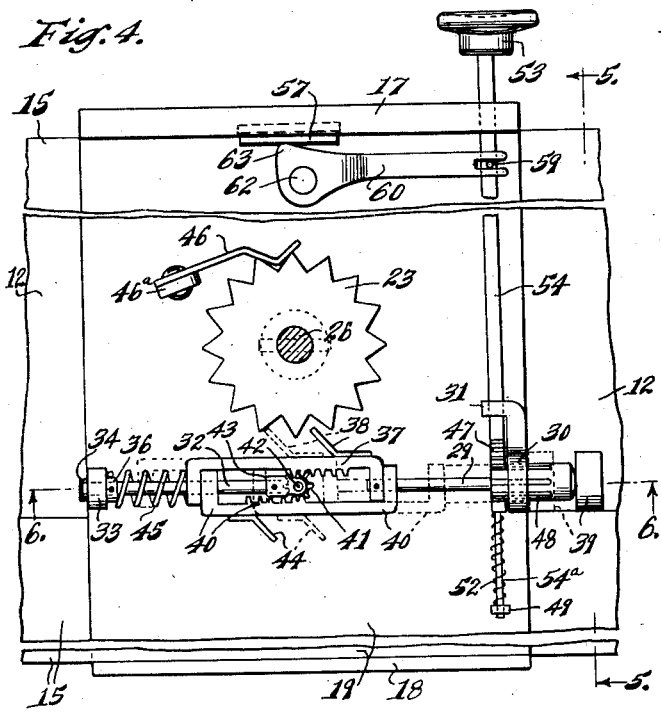
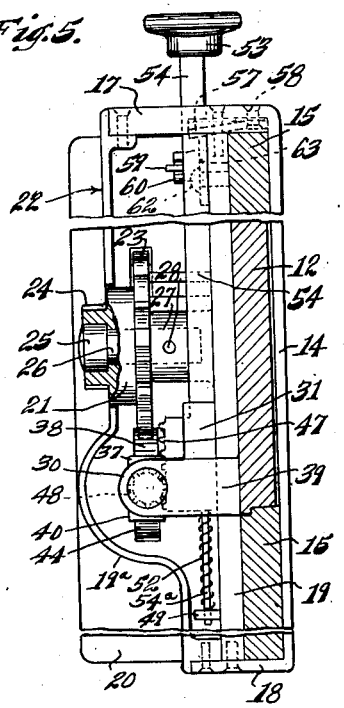
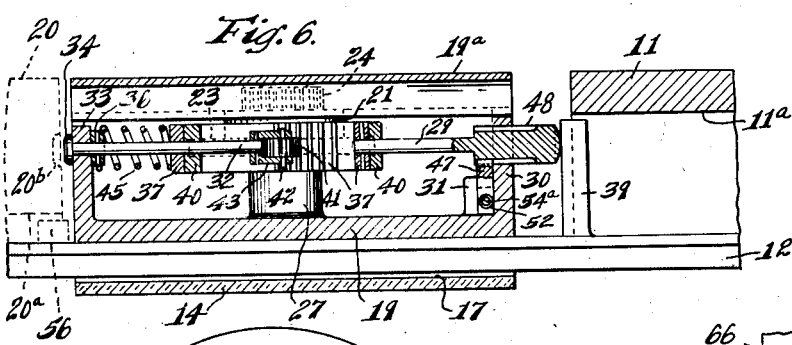
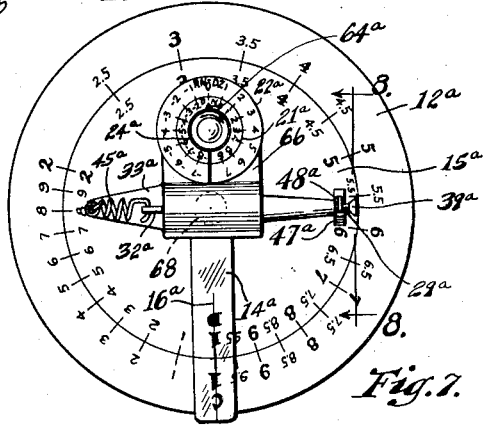
INVENTOR.
Arthur F. Eckel.
BY
Bair & Freeman
Att'ys.

Patented Sept. 2, 1947

2,426,601

UNITED STATES PATENT OFFICE 2,426,601

CALCULATOR AND DECIMAL POINT LOCATOR

Arthur F. Eckel, Chicago, Ill., assignor to Myrtle Scott Eckel, Chicago, and Louise Wickersham Pickett, La Grange, Ill.

Application October 5, 1945, Serial No. 620,506

18 Claims. (Cl. 235—64.3)

This invention relates to a calculator of the "slide rule" variety and a decimal point locator associated therewith whereby the decimal point in a calculation can be partially determined from a dial which is automatically operated in response to movements of the slider and rider of the slide rule during the course of a calculation.

This application is a continuation in part of my copending application Serial No. 490,108, filed June 7, 1943.

One object of my invention is to provide a decimal point locator which may be mounted directly on the rider of a slide rule and which is provided with dials and cooperating indicia arranged to assist in indicating the decimal point location in the answer to a problem in response to the calculation of such problem on the slide rule, the movable dial of the decimal point locator being successively advanced in one direction or the other when the answer goes "off scale" at either end of the slide rule.

Another object is to simplify the determination of the decimal point in the answer so that calculation, according to a simplified formula involving the number of factors, digits and zeros in the calculation will indicate a difference number, which difference number can then be utilized for the purpose of registering with a certain region number, the region number being indicated on a dial of the decimal point locator in accordance with the number of times the answer goes off scale.

Still another object is to provide a decimal point locator having a difference number scale on one part and a region number scale on another part which cooperate with each other to indicate the position of the decimal point in numbers of the first, one-half and one-third powers of the numbers. These scales may be extended on to additional powers of the numbers in an obvious manner.

A further object is to provide a decimal point locator wherein the region number is automatically indicated by having the region number scale mounted on the rider, and a dial of the locator being rotated through a ratchet and pawl arrangement in response to movement of either the slide or the rider in relation to the stator of the slide rule.

Still a further object is to provide a difference number scale on one dial of the decimal point locator and utilize the region number scale on another dial thereof for also reading digits and zeros in the answer, the region number scale being thereby a combined region number—digits-zero scale on which the digits and zeros in the answer can be read.

An additional object is to provide a modified form of the decimal point locator which is readily applicable to a rotary slide rule.

With these and other objects in view, my invention consists in the construction, arrangement, and combination of the various parts of my decimal point locator and its relation to a slide rule of either the straight or rotary type whereby the objects contemplated are attained as hereinafter more fully set forth, pointed out in my claims and illustrated in the accompanying drawings, wherein:

Fig. 4 is an enlarged rear elevation of the decimal point locator as shown in Fig. 3 with the rear cover removed to show the operating mechanism of the decimal point locator.

Fig. 5 is a sectional view on the line 5—5 of Fig. 4 showing details of construction.

Fig. 6 is a sectional view on the line 6—6 of Fig. 4 showing further details of construction.

Fig. 7 is a front elevation of a rotary type of slide rule with a modified form of my decimal point locator mounted thereon; and Fig. 8 is a sectional view on the line 8—8 of Fig. 7.

Figure 1:
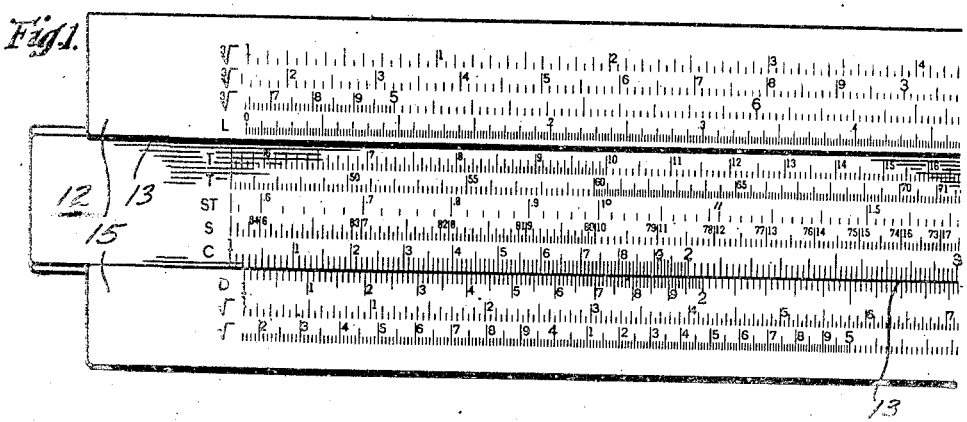
Fig. 1 is an enlarged front elevation of a straight slide rule embodying my invention and showing the left half of the rule.

On the accompanying drawing I have used the reference numeral 15 to indicate the stator of a slide rule, 12 the slide thereof and 14 the rider. The rider 14 is a transparent panel having the usual hairline 16 thereon for indicating purposes. The separation lines between the stator and slide on the front of the slide rule are indicated at 13.

The rider has end walls 17 and 18 as shown in Fig. 5 extending rearwardly across the upper and lower edges of the stator 15 for connection with a decimal point locator on the back of the slide rule, the base of which is indicated at 19. The stator 15 it will be noted is formed of two horizontal bars and they are connected together by vertical cross pieces 20 and 11 on the backs and at the ends of the bars, between which the rider and decimal point locator may travel.

Figure 2:
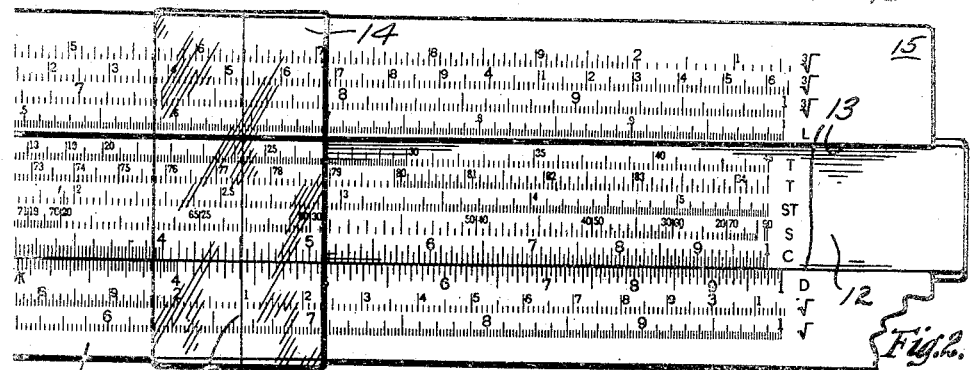
Fig. 2 is a similar front elevation showing the right half of the rule and a front view of the rider thereon, Fig. 2 being a continuation of the right hand end of Fig. 1.

Referring to the front of the slide rule as shown in Figs. 1 and 2 there is a succession of scales from top to bottom thereof. The first four scales are on the stator 15, three of them being cube root scales indicated $$\sqrt[3]{\phantom{x}}$$

These may be referred to as the upper, middle and lower cube root scales without the necessity of applying reference numerals to them. The fourth scale is a log scale, indicated as L.

The next five scales are on the slide 12 and appear between the separation lines 13. These five scales may be classified as follows: The upper T scale (indicated T) is the tangent scale of angles between 5.7° and 45°. The lower T scale (also indicated T) is used on angles between 45° and 84.3°. The third scale on the slide (ST) is for sines and tangents of small angles. The fourth scale (S) is for sines of angles between 5.73° and 90°. The fifth scale is the regular C scale of an ordinary slide rule used in multiplication and division computations.

The next scale (D) is the ordinary D scale on the stator of the slide rule used in multiplication and division computations. Below the D scale are an upper square root scale ($\sqrt{\phantom{x}}$) and a lower square root scale (also indicated $\sqrt{\phantom{x}}$). These will be hereinafter referred to as the upper $\sqrt{\phantom{x}}$ scale and the lower $\sqrt{\phantom{x}}$ scale.

Referring now to the construction of the decimal point locator mounted on the base 19 and the mechanism being shown particularly in Fig. 4 (Figs. 5 and 6 showing details thereof) there is a rotary dial 21 and a stationary dial 22. The rotary dial 21 may be referred to as a difference number scale and is labeled DN. The stationary scale 22 may be referred to as a region number—digit-zero scale and is referred to by the reference numeral RN—DZ.

The dial 21 is a part of a ratchet wheel 23 and the two may be manually rotated clockwise for resetting purposes by means of a knurled knob 24. The dial and the ratchet wheel are mounted on a stationary stud 26 extending from a hub 27 of the base 18, and having a head 25, the stud being secured in the hub by a pin 28.

For automatically rotating the dial 21 clockwise in Fig. 4 I provide the following described mechanism. A shaft 29 is slidable through a bearing 30 extending outwardly from the base 19 and has a yoke shaped rack 37 secured at its right hand end thereto. The left hand end of the yoke is slidable on a shaft 32 which is rotatably and non-slidably mounted in a bracket 33 as by a head 34 and a collar 36 on the shaft. The bracket 33 extends outwardly from the base 19. Secured to the rack 37 is a leaf spring pawl 38 to cooperate with the teeth of the ratchet wheel 23. The shaft 29 may be slid toward the left in Fig. 4 for rotating the difference number (DN) dial 21 clockwise one scale division by a lug 39 mounted in the proper position on the slide 12. This position is shown by dotted lines.

A second yoke shaped rock 40 has its ends slidable on the shafts 29 and 32 and the two racks are opposed to each other on opposite sides of a pinion 41 that meshes with both racks. The pinion 41 is carried by a yoke 43 on the shaft 32 as shown in Figs. 4 and 6. The purpose of this arrangement is so that the assembly of racks 37 and 40 and pinion 41 can be rotated a half revolution for coaction of a second leaf spring 44 carried by the rack 40 with the teeth of the ratchet wheel 23 instead of the pawl 38 for a purpose which will hereinafter appear.

The parts are moved from the full line position to the dotted line position against the action of a return spring 45 and are limited in the dotted position by engagement of the arms of the yoke 40 with the parts 43 and 48 so that at the limit of movement the right index or 10 mark on the C scale of the slide will match the hairline 16 of the rider accurately without the necessity of registering the mark with the hairline by sight. This speeds up the operation of the slide rule in an obvious manner. In order to hold the ratchet wheel 23 against undesirable rotation during return movement by the spring 45 when the pawl 38 or the pawl 44 drags against the ratchet teeth, a holding pawl 46 is provided which is anchored to a bracket 46a extending from the base. The knob 24 when rotated manually is always rotated clockwise as it is normally held against counterclockwise rotation by the pawl 38.

I have described how the lug 39 rotates the dial 21 clockwise. There is a time during the operation of the decimal point locator when it is desirable for the dial to be rotated counterclockwise, particularly during division operations as distinguished from multiplication operations. For this purpose the pawl 44 actuates the ratchet wheel 23 and is brought into position when doing so by rotation of the shaft 29 a half revolution.

Such half revolution of rotation is effected by means of a rack 47 coacting with a pinion section 48 of the shaft 29. The rack 47 is part of a bar 54 which extends slidably through a guide ear 31 and is normally in the position of Fig. 4 with the rack 47 against the ear 31 under the action of a spring 52 on a rod-like extension 54a of the bar 54. The extension 54a slides through an ear 49.

When moving the rider 14 a knob 53 of the lower end (Fig. 1) of the bar 54 is pressed upwardly by the thumb of the user. Since the slide rule is turned over in Fig. 4 this knob appears at the top. Downward movement of the bar 54 and the rack 47 in Fig. 4 will rotate the shaft 29 a half revolution until the lower end of the knob 53 strikes the rider wall 17. In this instance the rider is moved to the right until the hairline 16 matches the right index (10) on the slide 12 and since the slide and its lug 39 are stationary the pinion section 48 of the shaft 29 will be stopped, and the rider in its continued movement will actuate the racks 37 and 40 to the dotted position of Fig. 4 (with relation to the rider and decimal point locator itself), thus causing the pawl 44 (now up instead of down) to rotate the ratchet wheel 23 one tooth counterclockwise.

Figure 3:
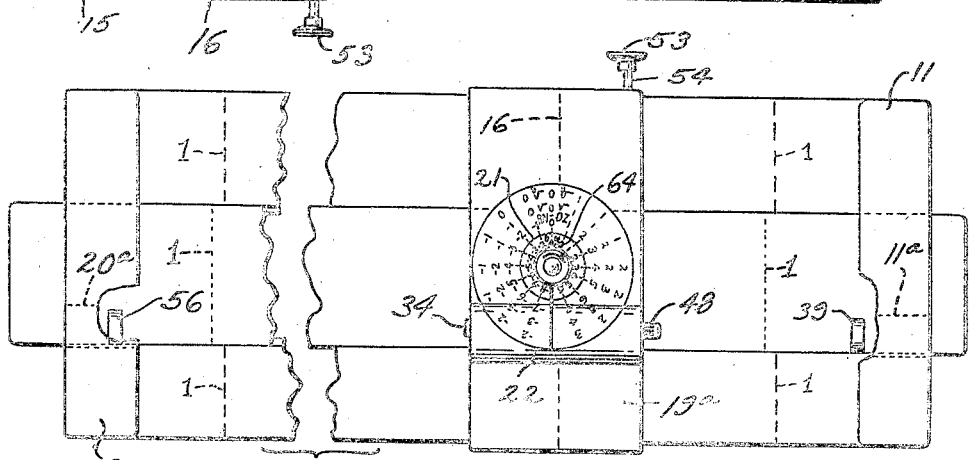
Fig. 3 is a view of the reverse side of the slide rule and decimal point locator, the rule in this figure being turned top for bottom with respect to the rule shown in Figs. 1 and 2.

Other conveniences for facilitating the operation of the slide rule consist of the cross bars 20 and 11 being so positioned that when the rider strikes them the hairline of the rider is on the index 1, or index 10 respectively, of the D scale. Also a stop 56 is mounted on the slide 12 as shown in Fig. 3 for engaging the left side of the decimal point locator when the slide is pulled toward the right until the left index, or 1 on the C scale matches the hairline on the rider. At this time the rider is locked on the stator 15 by the following described mechanism.

A friction spring 57 is secured as at 58 to the wall 17 of the rider 14. This spring normally engages the lower edge of the stator 15 (upper edge in Figs. 4 and 5). When the knob 53 is pressed upwardly (downwardly in Fig. 4) a pin 59 carried by the bar 54 swings a cam lever 60 clockwise around a pivot 62 so that a lobe 63 on the cam lever engages the spring 57 for releasing it from frictional engagement with the stator. Thus when it is desirable to slide the rider, the rider is unlocked from the stator due to pressing upwardly on the knob 53 during the rider moving operation. When the rider and the knob 53 are released, then the rider is locked to the stator and the slide is then manipulated. Thus the knob 53 serves both to set the pawl mechanism 38—44 for counterclockwise rotation of the dial 21 and at the same time unlock the rider with respect to the stator.

The foregoing description of the mechanism does not include the purpose of the scales on the dials 21 and 22, as it is believed this can best be explained by first explaining the theory of decimal point location with a few problems in both multiplication and division. I shall then go into the theory of the decimal point locator and the formula I use for the basis of its operation.

DECIMAL POINT LOCATION

*Locating the decimal point in multiplication*

Although in simple problems the position of the decimal point can be estimated, there are many problems in which this part of the work is more difficult. There are several ways of simplifying the work. The method described below makes use of the decimal point locator already described and which may be mounted on the back of a rider of a slide rule.

When numbers are greater than 1 the number of digits to the left of the decimal point will be counted. Thus 734.05 will be said to have 3 digits. Although as written the number indicates accuracy to five digits, only three of these are at the left of the decimal point.

Numbers that are less than 1 may be written as decimal fractions. Only positive real numbers are being considered in this discussion. Thus .673, or six hundred seventy-three thousandths, is a decimal fraction. Another example is .000465. In this number three zeros are written to show where the decimal point is located. One way to describe such a number is to tell how many zeros are written to the right of the decimal point before the first non-zero digit occurs.

In scientific work a zero is often written to the left of the decimal point, as in 0.00541. This shows that the number in the units' place is definitely 0, and that no digits have been carelessly omitted in writing or printing. The zeros will not be counted unless they are (*a*) at the right of the decimal point, (*b*) before or at the left of the first non-zero digit, and (*c*) are not between other digits. The number 0.000408 will be said to have 3 zeros (that is, the number of zeros between the decimal point and the 4).

*Examples*

| Number | Number of digits to be counted | Number of zeros to be counted |
|---|---|---|
| 64523. | 5 | 0 |
| 802.7 | 3 | 0 |
| 0.00457 | 0 | 2 |
| 3.05 | 1 | 0 |
| .00206 | 0 | 2 |
| 65.023 | 2 | 0 |
| .00006 | 0 | 4 |

Now taking a simple example such as $2 \times 3 \times 3$ we begin with the indices (1 and 10 marks) of the slide 12 corresponding to the indices of the stator 15, and the hairline 16 of the rider 14 over the left indices. The DN dial 21 is set with a black arrowhead 64 thereon matching the zero (0) on the RN—DZ scale on the dial 22. This step must be initially taken to prevent an erroneous decimal point location in a calculation.

The first operation then is to move the rider until the hairline matches 2 on the D scale of the slide rule. During this operation the knob 53 is pressed upwardly so as to release the lock spring 57 and permit free movement of the rider. The next step in the calculation is to move the slide 12 to the right until its left index is under the hairline 16, or until the stop lug 56 strikes the left side of the rider, the rider at this time being locked to the stator as already explained.

The third step in the operation is to move the rider until the hairline is over 3 on the C scale. This gives an answer 6 on the D scale. The slide may now be moved until 1 on the C scale is under the hairline 16 so that the final factor (3) of the problem may be located on the C scale and opposite it the answer may be read on the D scale. The 3 on the C scale is "off scale" with respect to the D scale however, and therefore it is necessary to return the slide toward the left until its right index matches the hairline. In doing this the lug 39 depresses the pinion 48 and the shaft 29 for causing the pawl 38 to rotate the ratchet wheel 23 and thereby move the dial 21 clockwise and the arrowhead 64 then matches the +1 on the RN—DZ scale.

The final step in the calculation is to multiply the answer 6 by 3 (the final factor of our example) which is done by unlocking and moving the rider to the left until the hairline 16 matches 3 on the C scale, whereupon the answer 18 appears on the D scale.

To determine the number of digits or zeros in the answer, the slide rule is turned over and the position of the arrowhead 64 is noted. Since it opposite +1 on the RN—DZ scale the decimal point can now be placed by solving for our problem $2 \times 3 \times 3$ the following formula:

$$DN = D - (F + Z) \text{ or } 3 - (3 + 0) = 0$$

and read the digits or zeros (DZ) of the answer on the RN—DZ scale (dial 22) opposite the difference number (0) on the DN scale (dial 21). This DZ number is +2 which indicates that there are two digits in the answer, or in other words the answer is 18 and not 1.8 or 180. In this formula, D, F and Z indicate the digits, factors and zeros respectively in the problem $2 \times 3 \times 3$ which are D=3, F=3 and Z=0.

*Locating the decimal point in division*

In problems in division the operations are reversed as the slide rule usually runs off scale to the left. When the quotient falls beyond the left index of the D scale as in an example such as $2 \div 4$, the rider 14 is moved to the right index on the C scale and in being so moved depression of the knob 53 by the operator's thumb causes the assembly of racks 37 and 40 and pinion 41 to be rotated a half turn so that the pawl 44 instead of the pawl 38 is next to the ratchet wheel 23. This rotation, of course, is effected by the rack 47 moving downwardly and thereby rotating the gear 48 and the shaft 29 clockwise from the Fig. 5 position. When the knob 53 hits the rider wall 17 the movement of the bar 54 is thereby limited to insure only a half revolution of the assembly.

As the rider is moved toward the right, the right hand end of the gear 48 engages the lug 39 on the slide 12, thereby stopping the movement of the rack 37 while the rider continues to move and this results in the rack 40 being moved toward the right at twice the speed of the rack 37, whereas the ratchet wheel 23 moves at the same speed as the rider. This causes the pawl 44 which is now next to the ratchet wheel to rotate the ratchet wheel counterclockwise one scale division for indicating $-1$ instead of zero as the region number on the RN—DZ scale opposite the arrowhead 64. The answer can now be read opposite the right index on the C scale, such answer being 5 on the D scale. Since the region number is $-1$ it indicates that the answer should be .5 as $D-(F+Z)=0$ in both the numerator and denominator of $$\frac{2}{4} \text{ is 0 and } 0-0=0$$

Since the arrowhead 64 on the DN scale has moved to $-1$ on the RN—DZ scale, opposite 0 on the DN scale, 0 on the RN—DZ scale indicates no zeros and no digits in the answer, or an answer of .5. This will be more fully explained beginning in the third paragraph hence.

The foregoing description of examples in multiplication and division are comparatively simple in order to illustrate the operation of the decimal point locator and do not take into consideration those problems involving both multiplication and division. Both types, however, may be performed on the slide rule and the decimal point locator will operate correctly to indicate the region number at the end of the calculation providing the dial 21 has been set with the arrowhead 64 opposite zero on the RN—DZ scale at the beginning of such calculation.

A complete outline for locating the decimal point in problems involving both multiplication and division, in square roots and squares, in cube roots and cubes, and in logarithms and trigonometry will be found in my copending application Serial 578,517 filed February 16, 1945. The computations involving other scales on the slide rule and the theory of the decimal point locator are fully explained therein.

In more complicated problems such as where there is a numerator consisting of several factors multiplied by each other and a denominator also including several factors multiplied by each other the decimal point locator is used in connection with the following formula:

$$DN = Dn - (F_n + Z_n) - [D_d - (F_d + Z_d)] - 1$$

In such formula

DN is the difference number.
$D_n$ is the number of digits in the numerator.
$D_d$ is the number of digits in the denominator.
$F_n$ is the number of factors in the numerator.
$F_d$ is the number of factors in the denominator.
$Z_n$ is the number of zeros in the numerator, and
$Z_d$ is the number of zeros in the denominator.

This formula holds true in all calculations on a slide rule wherever the answer doesn't go off scale. While on scale the user is operating in a "region" which may be termed "zero" and when the answer first goes off scale to the right, that can be termed region "+1." The second time it goes off scale to the right the region can be termed "+2," and the first time it goes off scale to the left the region can be indicated as "−1," and so on.

This region number is automatically kept track of on the decimal point locator by the movements of the dial 21 so that the arrowhead 64 carried thereby will take up successive positions opposite different divisions of the RN—DZ scale on the stationary dial 22. By then calculating the difference number (DN) in the above formula the decimal point in the answer can be read on the RN—DZ scale opposite the difference number on the DN scale. As far as the −1 at the end of the formula is concerned, this can be ignored with the indicia system I show on the DN scale as it is taken care of in all problems by putting the arrowhead 64 at the −1 position instead of at the 0 position. My copending application explains fully how the above formula is determined and why it is correct for all problems.

In Figs. 7 and 8 a rotary slide rule is illustrated wherein the stator with the D scale thereon is indicated at 15a and the rotor with the C scale thereon is indicated at 12a, the rotor corresponding to the slide in the first described rule. The rider is in the form of a transparent arm 14a carried by a housing 66 pivoted on a center post 68 of the stator 15a. The rider has a hairline 16a thereon.

The C and D scales are shown merely by way of illustration and the other scales such as square root, cube root and trigonometric scales are omitted, but of course can be included if desired.

The housing 66 encloses a mechanism similar to that shown in Fig. 4 to operate the movable dial 21a with respect to the stationary dial 22a carried by the housing 66. Other parts of the decimal locator mechanism are given the same numerals as heretofore used with the addition of $a$ wherever the parts correspond.

Inasmuch as the ratchet wheel and pawl arrangement 23, 38—44 is similar to that shown in Fig. 4, it is not illustrated in detail but certain modifications in the structure are shown in Figs. 7 and 8. These modifications consist of eliminating the spring 45 and instead using a special spring 45a hooked to the rod 32a in such manner that the spring 45a having its outer end anchored to a bracket 33a extending from the housing 66, pushes the rod normally toward the right or into the housing 66 and at the same time holds it in a centered position with a lug 48a of the shaft 29a pointed toward the stator 15a as shown by dotted lines in Fig. 8.

As the rider 14a and the housing 66 are rotated in one direction or the other, the lug 48a contacts a cam 47a on the stator 15a as the hairline 16a passes the D index line for swinging the shaft 29a a quarter revolution in one direction or the other depending upon the direction of rotation of the rider about the pivot 68. After the lug 48a leaves the cam 47a the spring 45a either winds or unwinds to return the shaft 29a to its initial position.

Also each time the rider passes the index line on the D scale, a second cam 39a on the stator 15a pushes the shaft 29a inwardly to actuate the pawls 38 and 44, and thereby rotate the ratchet wheel 23 (see Fig. 4) in one direction or the other depending on which pawl is in position next to the ratchet wheel. Thus the DN scale on the dial 21a is rotated clockwise during multiplication when the rider is rotated clockwise with respect to the stator, and the dial is rotated counterclockwise during reverse rotation of the rider when the hairline 16a passes the index on the D scale.

The lug 48a and the cam 47a first swing the pawls 38 and 44 to a proper position for rotation of the dial 21a in the proper direction and the cam 39a then actuates the dial and automatically changes its position to correspond to the proper region number or number of times the computation goes beyond one revolution of the stator of the rotary slide rule. This arrangement eliminates the necessity of manually reversing the pawls as in the case of a straight slide rule when the rider is moved. In the rotary type of slide rule the scales are repetitive and accordingly the mechanism for properly reversing the pawl action is obviously much simpler.

When the rider is rotated a complete revolution the dial 21a moves one scale division at the time the hairline 16a passes the D index and the rider can go on and move any number of revolutions with the dial 21a adding or subtracting scale divisions to determine the region number within the limits of the dials 21a and 22a. These dials, of course, can be graduated quite finely so that they can take care of many region numbers. The arrangement, however, is limited to a half revolution in either the minus or plus direction and after a calculation is completed then of course the number of digits or zeros in the answer is determined by solving the formula—

$$D_n-(F_n+Z_n)-[D_d-(F_d+Z_d)]$$

and the answer to this formula giving the difference number (DN). The difference number is then located on the scale 21a and opposite it on the RN—DZ scale the digits or zeros in the answer is read.

On the dial 22 in Fig. 3 the number of digits or zeros in the answer may also be determined for square root and cube root and for squares and cubes on the two outer rows of numbers in the manner fully set forth in my copending application above referred to.

From the foregoing specification it is believed obvious how the decimal point locator operates during the course of a calculation on either a straight or a rotary slide rule to automatically indicate a region number. The factors, digits and zeros in the numerator and denominator must then be taken into consideration and calculated in connection with each problem worked out on the slide rule, but this is a relatively simple operation and derives its simplicity from a formula which has been reduced to the least number of elements.

This formula—

$$DN=D_n-(F_n+Z_n)-[D_d-(F_d+Z_d)]$$

is one in which, concisely stated, $D_n$ and $D_d$ designate for the answer the total number of digits to the left of the decimal point for those numbers greater than one in the numerator and denominator respectively, $F_n$ and $F_d$ designate the total number of factors in the numerator and denominator respectively, and $Z_n$ and $Z_d$ designate the total number of zeros to the right of the decimal point in the numerator and denominator respectively. This formula omits from consideration that 1 must be subtracted from the formula to get the proper result, but this is taken care of in all decimal point calculations by placing the arrow 64 over —1 instead of over 0 on the DN scale.

Some changes may be made in the construction and arrangement of the parts of my calculator without departing from the real spirit and purpose of my invention, and it is my intention to cover by my claims any modified forms of structure or use of mechanical equivalents which may be reasonably included within their scope.

I claim as my invention:

1. In a slide rule having a C scale element, a D scale element and a rider, a decimal point locator mounted on said rider and comprising a pair of dials, one graduated for difference numbers, and the other for region numbers and digits or zeros in the answer, one of said dials being stationary and the other rotatable relative thereto during movement of said C scale element and said rider whenever the hairline of the rider approaches an index of the C scale element in one direction for determining a region number indicating both on and off scale regions of the slide rule wherein successively answers in a computation fall, means effective to cause reverse rotation of the rotatable dial when the rider approaches said index of the C scale element in the opposite direction, said dials giving a final region number reading on the region number—digit-zero scale, at the —1 position on the difference number scale, and opposite the difference number on the difference number scale giving the digits or zeros in the answer on the region number—digit-zero scale after said difference number has been determined by the formula $$D_n-(F_n+Z_n)-[D_d-(F_d+Z_d)]$$

wherein $D_n$ and $D_d$ designate for the answer the total number of digits to the left of the decimal point for those numbers greater than 1 in the numerator and denominator respectively, $F_n$ and $F_d$ designate the total number of factors in the numerator and denominator respectively, and $Z_n$ and $Z_d$ designate the total number of zeros to the right of the decimal point in the numerator and denominator respectively.

2. In a slide rule having a C scale element, a D scale element, and a rider, a decimal point locator comprising a pair of dials, one graduated for difference numbers, and the other for region numbers and digits or zeros in the answer, one of said dials being stationary and the other rotatable, means for causing rotation of the rotatable dial comprising a ratchet wheel and a pair of pawls, one of said pawls for causing rotation in one direction, and the other for causing rotation in the other direction, a projection on said D scale element for operating both of said pawls when the rider assumes a position with its hairline registering with an index on the C scale element, said other dial indicating a region number corresponding to both on and off scale regions of the slide rule wherein successively answers in a computation may fall, whereby the final region number may be taken from the region number scale at —1 position on the difference number scale, and opposite the difference number on the difference number scale, a digit or zero reading for the answer may be taken on the digit-zero scale after determination of said difference number depending on the digits, factors and zeros in the computation.

3. In a rotary slide rule and decimal point locator, a C scale element and a D scale element relatively movable, a rider having a hairline for cooperating with the C and D scales on said elements, a decimal point locator mounted on said rider and having a pair of dials, means for rotating one of said dials, the other of said dials being stationary, said means comprising ratchet and pawl mechanism of reversible type, means on said C scale element for engaging said ratchet and pawl mechanism for operating it and thereby the rotatable dial in one direction when the rider and C scale element move relatively in one direction, and in the opposite direction when the rider and C scale element move relatively in an opposite direction, and region number indicia on one of said dials to aid in determining the number of digits or zeros in the answer to a computation on the slide rule.

4. In a slide rule, relatively movable computing elements having the usual logarithmic scales thereon, a rider movable relative to said elements, a pair of dials, one of which is stationary and the other movable, one graduated for reading region numbers and digits or zeros, and the other cooperating therewith and graduated for reading difference numbers, a decimal point locator carried by said rider and including said dials, and means for operating said movable dial when the hairline of the rider registers with an index of said elements indicating the beginning of an off scale portion of the computation, said movable dial being moved thereby in one direction or an opposite direction depending on the direction that the computation goes off scale, whereby a region number corresponding to a computation on the slide rule may be read on the region number—digit-zero scale in relation to the difference number scale, and the number of digits or zeros in the answer can then be read on the region number—digit-zero scale opposite the difference number on the difference number scale, said difference number being determined by the number of digits, factors and zeros in the computation.

5. In a slide rule having a stator, a slide, and a rider, a decimal point locator comprising a pair of dials, one graduated for difference numbers and the other for region numbers and digits or zeros in the answer, one of said dials being stationary and the other rotatable, means for causing rotation of said rotatable dial comprising a ratchet wheel and a pair of pawls, one of said pawls for causing rotation in one direction, and the other for causing rotation in the other direction, a projection on the slide for operating said pawls when the rider assumes a position with its hairline registering with the right index of the slide, said other dial indicating a region number corresponding to both on and off scale regions of the slide rule wherein successively answers in a computation may fall, said rider having means to lock the same relative to said stator, means to reverse said pawls when the locking means is unlocked for movement of said rider relative to said slide whereby the final region number may be taken from the region number scale at a predetermined position on the difference number scale, and opposite the difference number on the difference number scale, the digits or zeros in the answer may be read on the digit-zero scale after determination of said difference number depending on the digits, factors and zeros in the computation.

6. A slide rule having a stator, a slide, and a rider, a decimal point locator mounted on said rider and comprising a stationary dial and a rotatable dial, ratchet and pawl mechanism for effecting rotation of the rotatable dial to determine a region number indicating off scale regions of the slide rule, said decimal point locator having means to lock the same to said stator, means on said slide for engaging said ratchet and pawl mechanism for operating it a scale division when the hairline of the rider and the right index of the slide register with each other, means effective when moving said rider to cause reverse rotation of the rotatable dial when said means on said slide operates said ratchet and pawl mechanism, said dials indicating a region number reading at a predetermined position on the difference number scale so that opposite the difference number on the difference number scale the digits or zeros in the answer may be read on the digit-zero scale, said difference number being determined by the number of digits, factors and zeros in the numerator and the denominator in the computation.

7. A slide rule having a stator, a slide, and a rider, a decimal point locator comprising a pair of relatively rotatable dials, means for effecting relative rotation thereof to determine a region number indicating off scale regions of the slide rule, said decimal point locator having means to lock the same to said stator, means on said slide for engaging said first means for rotating one of said dials relative to the other and in one direction a scale division when the hairline of the rider and the right index of the slide register with each other, means effective when moving said rider to cause reverse rotation of said one of said dials when said means on said slide operates said first means as a result of moving said rider, said dials indicating a region number reading and at a predetermined position on a difference number scale indicating the digits or zeros in the answer on a digit-zero scale, said difference number being determined by the number of digits, factors and zeros in the computation performed on the slide rule.

8. In a slide rule of the character disclosed, a stator and a slide having the usual logarithmic scales, a rider, and a decimal point locator mounted on said rider and comprising a pair of dials, one stationary and the other movable, step by step operating mechanism for the movable dial and operated by the slide and rider when relatively moved so that the hairline of the rider matches the right index of the slide, means for locking said rider to said stator during movements of the slide, and means for unlocking the rider relative to the stator and for reversing the action of said mechanism when the rider is moved relative to said stator and said slide, the final position of one dial relative to the other on said decimal point locator indicating on or off scale regions used in determining the position of the decimal point in the computation.

9. In a slide rule of the character disclosed, a stator, a slide, a rider, and a decimal point locator mounted on said rider and comprising a stationary dial and a movable dial, step by step operating mechanism for said movable dial and operated by the slide and rider when relatively moved to a position where the hairline of the rider matches the right index of the slide, means for locking said rider to said stator during movements of the slide, means for unlocking the rider relative to the stator and for reversing the action of said mechanism when the rider is moved relative to said stator and said slide, the final position of one dial relative to the other on said decimal point locator indicating on or off scale regions used in determining the position of the decimal point in the computation, and means for limiting the movement of said mechanism so that the hairline of said rider matches the right index of said slide when said slide and rider are relatively moved for operating said mechanism.

10. In a slide rule of the character disclosed, a stator, a slide, a rider, and a decimal point locator mounted on said rider and comprising a pair of dials, one of which is stationary and the other movable, means on said stator to limit movements of said rider to positions where its hairline matches the left or right indices of said stator, step by step operating mechanism for said movable dial and operated by the slide and rider when relatively moved to a position where the hairline of the rider matches the right index of the slide, the final position of one dial relative to the other on said decimal point locator indicating on or off scale regions used in determining the position of the decimal point in the computation, and means for limiting the movement of said mechanism so that the hairline of said rider matches the right index of said slide when said slide and rider are relatively moved for operating said mechanism.

11. In a slide rule of the character disclosed, a stator, a slide, a rider, and a decimal point locator mounted on said rider and comprising a movable dial and a stationary dial, means on said slide to engage said rider and limit left hand movement of the rider relative to the slide to a position where the hairline of the rider matches the left index of the slide, step by step operating mechanism for said movable dial and operated by the slide and rider when relatively moved to a position where the hairline of the rider matches the right index of the slide, the final position of one dial relative to the other on said decimal point locator indicating on or off scale regions used in determining the position of the decimal point in the computation, and means for limiting the movement of said mechanism so that the hairline of said rider matches the right index of said slide when said slide and rider are relatively moved for operating said mechanism.

12. In a slide rule of the character disclosed, a stator, a slide, a rider, and a decimal point locator mounted on said rider and comprising movable and stationary dials, means on said stator to limit movements of said rider to positions where its hairline matches the left or right indices of said stator, means on said slide to engage said rider and limit left hand movement of the rider relative to the slide to a position where the hairline of the rider matches the left index of the slide, step by step operating mechanism for said movable dial and operated by the slide and rider when relatively moved to a position where the hairline of the rider matches the right index of the slide, the final position of one dial relative to the other on said decimal point locator indicating on or off scale regions used in determining the position of the decimal point in the computation, and means for limiting the movement of said mechanism so that the hairline of said rider matches the right index of said slide when said slide and rider are relatively moved for operating said mechanism.

13. In a slide rule of the character disclosed, a stator, a slide, a rider, and a decimal point locator mounted on said rider and comprising stationary and rotatable dials, means on said stator to limit movements of said rider to positions where its hairline matches the left or right indices of said stator, means on said slide to engage said rider and limit left hand movement of the rider relative to the slide to a position where the hairline of the rider matches the left index of the slide, step by step operating mechanism for said rotatable dial and operated by the slide and rider when relatively moved to a position where the hairline of the rider matches the right index of the slide, the final position of one dial relative to the other on said decimal point locator indicating on or off scale regions used in determining the position of the decimal point in the computation.

14. In a slide rule having a stator, a slide, and a rider, a decimal point locator mounted on said rider and comprising a pair of dials, one graduated for difference numbers and the other for region numbers and digits or zeros in the answer, one of said dials being stationary and the other rotatable during movement of said slide and said rider whenever the hairline of the rider approaches the right index of the slide or vice versa for determining a region number indicating both on and off scale regions of the slide rule wherein successively answers in a computation fall, said rider having means to lock the same to said stator while the slide is being moved and means to unlock the same from the stator when the rider is being moved, said unlocking means being effective to cause reverse rotation of said rotatable dial when the rider is moved to a position where its hairline matches the right index of the slide, said dials giving a final region number reading on the region number—digit-zero scale at the —1 position on the difference number scale so that opposite the difference number on the difference number scale the digits or zeros in the answer may be read on the region number—digit-zero scale after said difference number has been determined by the formula $$D_n-(F_n+Z_n)-[D_d-(F_d+Z_d)]$$

wherein $D_n$ and $D_d$ designate for the answer the total number of digits to the left of the decimal point for those numbers greater than 1, $F_n$ and $F_d$ designate the total number of factors, and $Z_n$ and $Z_d$ designate the total number of zeros to the right of the decimal point, each in the numerator and denominator respectively.

15. In a rotary slide rule and decimal point locator, a stator and a rotor having the usual logarithmic scales, a rotatable arm having a hairline for cooperating with the stator and rotor scales, a pair of scales carried by said arm one of said scales being stationary and the other movable in relation thereto, one graduated for reading region numbers and digits or zeros, and the other cooperating therewith and graduated for reading difference numbers, means for moving said movable scale, and means carried by said rotor and cooperating with said first means for operating the same in one direction when said rider moves in one direction relative to the rotor, and in the opposite direction when the rider moves in a reverse direction relative to the rotor.

16. In a rotary slide rule and decimal point locator, a stator and a rotor having the usual logarithmic scales, a rotatable rider stationary and movable dials, one graduated for reading region numbers and digits or zeros, and the other cooperating therewith and graduated for reading difference numbers, a decimal point locator carried by said rider and including said movable dial, and means for operating said dials when the hairline of the rider passes the index of the rotor, said last dial being moved by said means in one direction when the rider rotates clockwise, and in an opposite direction when it rotates counterclockwise, region number—digit-zero indicia on one dial and difference number indicia on the other to indicate the number of digits or zeros in the answer to a computation on the slide rule, said difference number being determined by the number of digits, factors and zeros in the computation.

17. In a rotary slide rule and decimal point locator, a stator and a rotor, a rider having a hairline for cooperating with the scales on the stator and rotor, a decimal point locator mounted on said rider and having a pair of dials, means for rotating one of said dials relative to the other comprising ratchet and pawl mechanism of reversible type, means on said rotor for engageing said ratchet and pawl mechanism for operating it and thereby said dial in one direction when the rider moves in one direction relative to the rotor and in the opposite direction when the rider moves in an opposite direction relative thereto, and region number indicia on one of said dials to aid in determining the number of digits or zeros in the answer to a computation on the slide rule.

18. In a rotary slide rule and decimal point locator, a stator having a D scale, and a rotor having a C scale, a rotatable arm having a hairline for cooperating with the stator and rotor scales, a pair of dials, one fixed and the other rotatable, one graduated for reading region numbers and digits or zeros and the other cooperating therewith and graduated for reading difference numbers, means for rotating said other dial relative to said fixed dial comprising ratchet and pawl mechanism, and means carried by said rotor and cooperating with said ratchet and pawl mechanism for operating the same for rotating said other dial in one direction when the rider moves in one direction relative to the rotor, and in the opposite direction when the rider moves in a reverse direction relative to the rotor whereby a region number corresponding to a computation on the slide rule may be read on the region number—digit-zero scale opposite −1 on the difference number scale, and the number of digits or zeros in the answer can then be read on the digit-zero scale opposite a difference number, said difference number being determined by the formula $$D_n - (F_n + Z_n) - [D_d - (F_d + Z_d)]$$

wherein $D_n$ and $D_d$ designate for the answer the total number of digits to the left of the decimal point for those numbers greater than 1 in the numerator and denominator respectively, $F_n$ and $F_d$ designate the total numbers of factors, and $Z_n$ and $Z_d$ designate the total number of zeros to the right of the decimal point in said numerator and denominator.

ARTHUR F. ECKEL.

REFERENCES CITED

The following references are of record in the file of this patent:

UNITED STATES PATENTS

| Number | Name | Date |
|---|---|---|
| 2,117,413 | Gilmore | May 17, 1938 |
| 2,363,642 | Cherney | Nov. 28, 1944 |